US008682832B2

United States Patent
Brillhart et al.

(10) Patent No.: US 8,682,832 B2
(45) Date of Patent: *Mar. 25, 2014

(54) APPLICATION OF NORMATIVE RULES IN A VIRTUAL UNIVERSE

(71) Applicant: International Business Machines Corporation, Armonk, NY (US)

(72) Inventors: David C. Brillhart, Orlando, FL (US); Christopher J. Dawson, Bethesda, MD (US); Michael D. Kendzierski, New York, NY (US); James W. Seaman, Fairfax, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/741,823

(22) Filed: Jan. 15, 2013

(65) Prior Publication Data

US 2013/0132324 A1    May 23, 2013

Related U.S. Application Data

(63) Continuation of application No. 12/500,894, filed on Jul. 10, 2009, now Pat. No. 8,380,649.

(51) Int. Cl.
*G06F 17/00* (2006.01)
*G06N 5/02* (2006.01)

(52) U.S. Cl.
USPC ............... 706/47; 709/224; 704/8; 463/42

(58) Field of Classification Search
None
See application file for complete search history.

(56) References Cited

U.S. PATENT DOCUMENTS

| | | | |
|---|---|---|---|
| 6,014,657 A | 1/2000 | Weida et al. | |
| 6,108,670 A | 8/2000 | Weida et al. | |
| 6,154,849 A | 11/2000 | Xia | |
| 6,377,263 B1 | 4/2002 | Falacara et al. | |
| 7,865,590 B2 * | 1/2011 | Zalewski | 709/224 |
| 2006/0184355 A1 | 8/2006 | Ballin et al. | |
| 2007/0191100 A1 | 8/2007 | Counts | |
| 2009/0113040 A1 | 4/2009 | Zalewski | |
| 2009/0170604 A1 | 7/2009 | Mueller et al. | |

OTHER PUBLICATIONS

U.S. Appl. No. 12/500,894, filed Jul. 10, 2009.
Non-Final Office Action (Mail Date Apr. 11, 2012) for U.S. Appl. No. 12/500,894, filed Jul. 10, 2009.
Response (File Date Jul. 11, 2012) to Non-Final Office Action (Mail Date Apr. 11, 2012) for U.S. Appl. No. 12/500,894, filed Jul. 10, 2009.
Notice of Allowance (Mail Date Oct. 11, 2012) for U.S. Appl. No. 12/500,894, filed Jul. 10, 2009.

* cited by examiner

*Primary Examiner* — Kakali Chaki
*Assistant Examiner* — Luis Sitiriche
(74) *Attorney, Agent, or Firm* — Patrick J. Daugherty; Driggs, Hogg, Daugherty & Del Zoppo Co., LPA

(57) ABSTRACT

The present invention teaches methods for applying an avatar behavior rule within a virtual universe environment. An avatar behavior rule and a violation threshold for the rule are defined for a virtual universe environment. The behavior of a collective plurality of avatars within the virtual universe is monitored for compliance with the rule, including determining an amount of compliance with the rule and comparing the compliance amount with the violation threshold. If the compliance amount does not exceed the violation threshold but avatars are complaining that the monitored behavior of another of the avatars is at an objectionable level, then the rule or the violation threshold is revised until the monitored behavior of the collective plurality of avatars within the virtual universe exceeds the revised violation threshold, or none of the avatars is complaining.

20 Claims, 2 Drawing Sheets

APPLICATION OF NORMATIVE RULES IN A VIRTUAL UNIVERSE

RELATED APPLICATION

This application is a continuation of U.S. application Ser. No. 12/500,894, filed Jul. 10, 2009.

FIELD OF THE INVENTION

The present invention generally relates to applying normative rules in a virtual universe domain in response to collective avatar behavior.

BACKGROUND OF THE INVENTION

A Virtual Universe (VU) is a computer-based simulated world or environment; other terms for VU's include metaverses, "3-D Internet" and Virtual World, and VU will be understood to represent any of these environments. Users inhabit and traverse a VU, and interact with other VU users through the use of an avatar, a graphical representation of the user often taking the form of a cartoon-like human though any two or three dimensional graphic image or rendering may be utilized. In order to participate within or inhabit a VU a user creates an agent which functions as the user's account, and upon which the user builds an avatar tied to an inventory of assets the user owns in the VU and associated with the agent.

Many VU's are represented using three dimensional (3-D) graphics and landscapes and are populated by many thousands of users or "residents," wherein the VU often resembles a real world or a fantasy/fictional world in terms of physics, houses, landscapes and in interpersonal communications with other user avatars. VU environments generally comprise a variety of man-made or computer application-generated artifacts, in one aspect representative of items and artifacts understood and recognized by users through their experiences in the real world as well, as through fictional experiences. Real property artifacts may include realistic walkways and streets, buildings (stores, casinos, etc.), parks, plazas, atriums, as well as fantasy environments such as other planets, or worlds of fictional literature and the arts. Personal property artifacts include a wide variety of items such as real-world motorcycles, tokens, clothing, as well as fantasy world potions, spacesuits, armor etc. Moreover, avatar artifacts representing users or automated applications (for example, an automaton greeter programmed to request user information inputs) may comprise a wide variety of visual and behavioral attributes, evidencing real-life human-like appearances and behaviors as well as fantastical powers, weapons or character appearances.

Large robust VU's and massively multiplayer online games, such as for example Second Life® (SECOND LIFE is a trademark of Linden Research, Inc. in the United States and/or other countries), Entropia Universe™ (ENTROPIA UNIVERSE is a registered trademark of MindArk PE AB in the United States, other countries, or both), The Sims Online™ (THE SIMS ONLINE is a trademark of Electronic Arts, Inc in the United States, other countries, or both), and There™ (THERE is a trademark of Makena Technologies, Inc. in the United States, other countries, or both) render and display detailed, large and complex graphic environments within which users may travel and participate as if a character in an expressionistic or fantastical fictional world or within a realistic or representational approximation of real life. A VU may also be defined with respect to multiple VU regions, virtual areas of land within the VU often residing on a single server, with each region amenable to provision and management by a one or more participating providers. The size and complexity and variety of resources found in a VU may be directly related to a number of providers participating and hosting regions through server hosting, and the success of a VU may depend upon attracting users and keeping them engaged and participating in the VU environment, thereby adding value to the providers who bear the cost in providing VU region content and services and who may correspondingly expect an appropriate level of multiple-user engagement as a return on their investment, as well as for other users who wish to engage many others in a large virtual community. For example an informational or service-related region managed by a governmental or non-profit organization may desire or expect a given level of VU user engagement and participation, and commercial region providers may desire to engage in a given level of commercial transactions (e.g. number of sales, advertising exposures or paying subscribers) or achieve a level of marketing exposure among VU users.

SUMMARY OF THE INVENTION

The present invention teaches methods for applying a collective behavior rule (e.g. a collective behavior norm or other rule or norm) to avatar behavior within a virtual universe environment. An avatar behavior rule and a violation threshold for the rule are defined for a virtual universe environment. The behavior of a collective plurality of avatars within the virtual universe is monitored for compliance with the rule, including determining an amount of compliance with the rule and comparing the compliance amount with the violation threshold. If the compliance amount does not exceed the violation threshold but avatars are complaining that the monitored behavior of one of the avatars is at an objectionable level, then the violation threshold is revised downward until the monitored behavior exceeds the revised violation threshold, or none of the avatars is complaining.

Still further, methods for applying an avatar behavior rule within a virtual universe environment also include producing computer executable program code, storing the code on a computer readable medium and providing the program code to be deployed and executed on a computer system. The program code includes instructions which, when executed on a computer system, cause the computer system to define an avatar behavior rule for a virtual universe environment, define a violation threshold for the rule, monitor a behavior of a collective of avatars within the virtual universe for compliance with the rule, and determine an amount of compliance of the monitored collective behavior with the rule. The instructions further cause the computer system to compare the compliance amount with the violation threshold, and if the compliance amount does not exceed the violation threshold but avatars are complaining that the monitored behavior of one of the avatars is at an objectionable level, to revise the violation threshold downward and monitor the behavior of the collective of avatars within the virtual universe for compliance with the rule until the monitored behavior exceeds the revised violation threshold, or none of the avatars is complaining.

Moreover, systems, articles and programmable devices configured for performing one or more method and/or process elements of the current invention are also provided for applying an avatar behavior rule within a virtual universe environment. Thus an exemplary programmable device has a processing means, a memory in communication with the processing means and a network interface in communication with the processing means and the memory and a virtual universe environment. Said processing means is configured to define an avatar behavior rule for the virtual universe environment, define a violation threshold for the rule, monitor a behavior of a collective of avatars within the virtual universe environment for compliance with the rule, and determine an amount of compliance of the monitored collective behavior with the rule. The processing means is further configured to compare the compliance amount with a violation threshold, and if the compliance amount does not exceed the threshold but avatars are complaining that the monitored behavior of one of the avatars is at an objectionable level, revise the violation threshold downward and monitor the behavior of the collective of avatars within the virtual universe environment for compliance with the rule until the monitored compliance amount exceeds the revised violation threshold, or none of the avatars is complaining

BRIEF DESCRIPTION OF THE DRAWINGS

These and other features of this invention will be more readily understood from the following detailed description of the various aspects of the invention taken in conjunction with the accompanying drawings in which.

Figure 1:
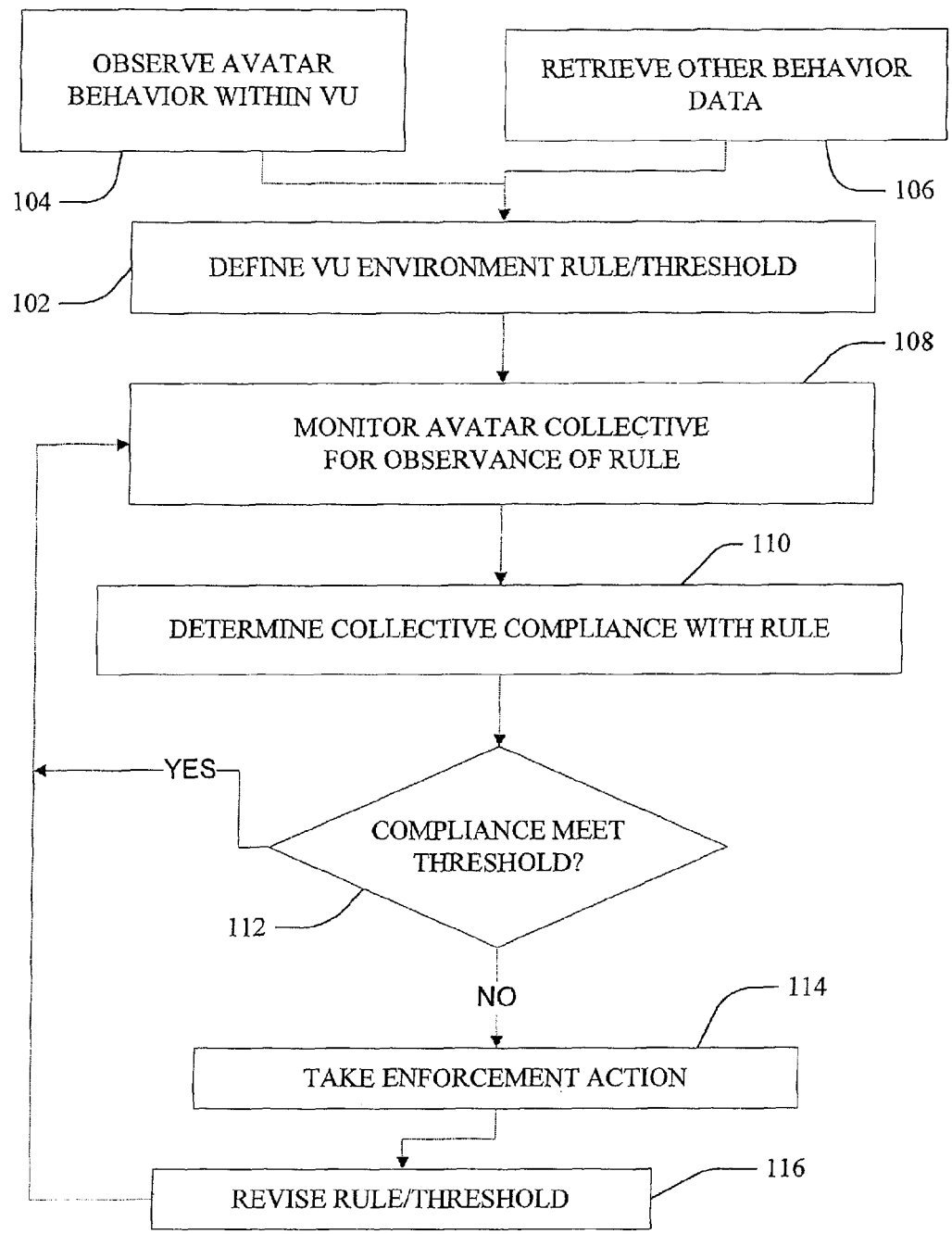
FIG. 1 is a flow chart illustrating application of an avatar behavior rule within a virtual universe environment according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Within a virtual world it is often necessary to govern and manage the behaviors of avatars, in one aspect in order to prevent offensive, threatening or dangerous actions or those otherwise violating a collective behavior norm of the VU or the expectations of other VU residents or users. Undesirable avatars or activities may discourage other users from engaging in or continuing to participate in a given VU, in some examples resulting in a direct loss of opportunities to provide services, advertising, revenue opportunities, etc.

In the physical or real world laws, rules and regulations govern the actions of individuals, for example through public or governmental entities, as well as provided and administered through private entities through agreements with governed individuals. However, the desire to control the actions of virtual universe residents by defining and enforcing rules and regulations within a virtual world must be balanced with the desires and needs of the intended avatar users. If rules are too stringent or otherwise objectionable to residents some may decline to engage the VU, resulting in the direct loss of their participation, as well as of others indirectly who may be influenced by objecting residents. Moreover, the effectiveness of a rule-based approach may be undermined if it becomes apparent to residents that others are disregarding the rule, and enforcement of a rule known to be routinely flaunted may diminish the credibility of the enforcing entity, or VU region or domain provider.

Referring now to FIG. 1, a method and process for applying an avatar behavior rule a virtual universe (VU) environment according to the present invention is provided. At 102 the process or system defines a collective behavior norm or other rule or norm for avatar behavior within the virtual universe domain, environment or region thereof, and also an application or violation threshold for the rule or norm(s). In one aspect the threshold is provided to specify what activity or amount or magnitude thereof will constitute a violation of the rule or norm(s).

The rule or threshold may be set or specified through a variety of methods. In some embodiments, the rule or threshold may be set as a function of collective group behavior observation data provided at 104 for a group of avatars within the virtual universe, for example including current or historic avatar behavior observation data within the VU or a portion thereof. Other avatar behavior data may also be considered at 106, for example avatar behavior data from other VU domains or regions, data generated through observation of VU user behaviors in the real-world, and relevant rules and regulations from the real-world or other VU domains. Still other data and information appropriate for consideration in defining a collective behavior norm or other norm or rule, a threshold for determining violations thereof, VU management actions associated with said violating, mechanisms for selecting one or more VU management actions as a function of user status or violation facts and context, will be apparent to one skilled in the art.

At 108 the actions and behaviors of a collective group of avatars within the VU are monitored and observed as a function of the rule defined at 102. Monitoring may be focused upon a selective subset group of avatars or upon an entire corporate body of all avatars within the virtual universe domain. At 110 the monitored behavior is compared to the defined rule and an amount or other value of compliance of the collective group with the rule is determined. At 112 the amount of compliance is compared to the defined threshold, in one aspect to determine whether the collective body of monitored avatars is generally complying with the defined rule as indicated by meeting requirements of the threshold, and in some embodiments to determine a value of divergence of the monitored avatar behavior from the rule-defined behavior.

At 112, if comparison to the threshold indicates that the determined amount of compliance or divergence value indicates that the collective behavior correlates with the defined rule, then the rule or its threshold is left unchanged and observing and monitoring continues at 108. Otherwise, if the determined amount of compliance or divergence value exceeds the threshold or comparison to the threshold otherwise indicates that the collective behavior is not in compliance with the defined rule, then the rule or threshold is revised at 116 and the collective is monitored for compliance with the rule and threshold as revised. In some embodiments rule or threshold revisions are iterative, with the process looping through monitoring at 108, determining compliance at 110, threshold comparison at 112 and rule/threshold revisions at 116 repetitively until the collective behavior is determined to comply with the rule within the threshold at 112. In some embodiments an optional enforcement or other action may also be taken by a monitoring or enforcement entity at 114 against one or more of the monitored collective avatars whose compliance value exceeds the threshold.

Figure 2:
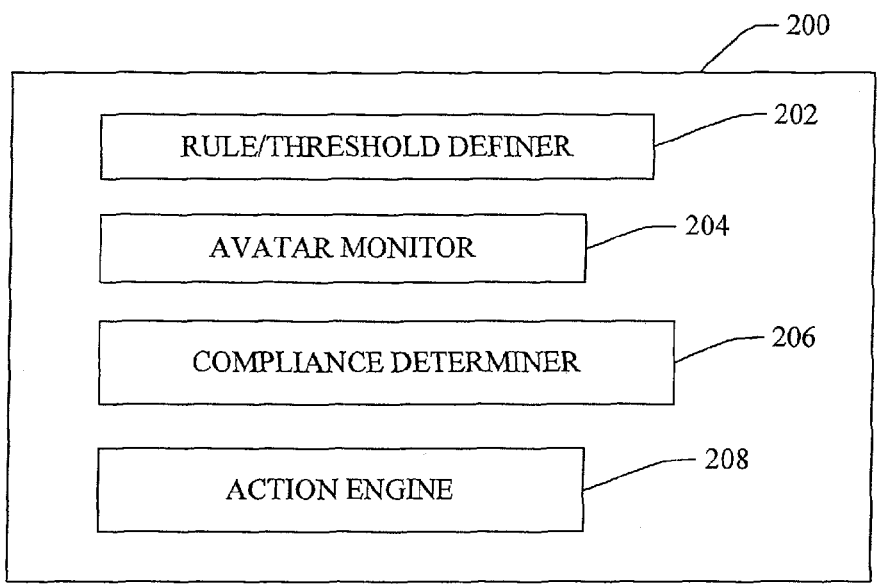
FIG. 2 is a block diagram illustration of a device configured to apply, set and/or revise a rule or application thereof to avatar behavior within a virtual universe environment according to the present invention.

FIG. 2 illustrates a logic machine 200 configured to set, apply and revise a rule or threshold within a virtual universe (VU) environment according to the present invention, for example through the process and methods described above with respect FIG. 1. Thus, the logic machine 200 comprises a rule/threshold definer component 202, in some embodiments configured to define a rule for avatar behavior or threshold for the rule as a function of collective avatar behavior data or other data. An avatar monitor component 204 is provided and configured to observe and monitor behavior of the collective plurality of avatars within the context of or as a function of the defined rule and threshold. A compliance determiner component 206 is provided and configured to determine if monitored collective avatar behavior meets the threshold and to responsively revise the rule or threshold through interaction with the definer component 202. In some examples the compliance determiner component 206 is further configured to instigate an enforcement action by an action engine component 208 against one or more of the collective avatars, for example by taking VU management or protective actions relative to one or more avatars or their associated users, or configuring an aspect of a VU client or provider application to stop or prevent a prohibited action, and other actions may be appropriate to one skilled in the art.

The present invention thus provides an enhancement to virtual universe environments which enables users, service providers and other virtual universe provider entities to define, revise or enforce rules as a function of the collective will of the residents of a VU determined by observing their behavior with respect to the rule. Embodiments of the present invention enable an enforcer entity to identify the appropriateness of a rule or its degree of enforcement as a function of an articulated or determined corporate will of a collective community, rather than through a predetermined, generic, inflexible or absolute rule. For example, rather than simply proscribe any use of offensive words, or an arbitrary number or frequency of offensive word use, an offensive word rule or violation threshold may be applied as a function of the determined behavior of a collective group of a VU environment, for example proscribing the use of offensive words greater than an average level of offensive word use of the collective. One embodiment proscribes offensive word usage greater than 20% of an average/mean offensive word usage observed by an entire collective of active avatars within a VU environment or region over a specified sample time period.

Normative rule-defining configurations, wherein a rule or threshold is set to an observed norm of actual collective avatar behavior, may provide for a more flexible and lenient supervisory atmosphere, one more welcoming and tolerant of resident avatar behaviors, and that may further grant dynamic leniency. Thus if a normative rule stays current to actual offensive word usage, and the collective use of offensive words is increasing within the VU or relative portion thereof, then a collective behavior norm or other rule or norm may become proportionately more lenient, wherein progressively higher levels of offensive word use are required before a rule violation is determined and any action taken against the violating avatar. In a similar fashion rules and associate thresholds may also be tightened: for example, avatars may not be exceeding a normative rule or threshold regarding offensive word use, yet one or more VU users participating within a VU domain may complain that objectionable levels of coarse or crude language are occurring within the VU, and thus the rule or its application threshold may be tightened to reduce the objectionable offensive word use.

In another aspect, people who speak the same language, live in the same geography, have similar fashion sense, hobbies, lifestyle, or preferences, etcetera, often have a natural affinity for, and feel more comfortable dealing with, each other in real-world interpersonal interactions. They may also share norms with respect to behaviors that diverge from a more general population: for example, avatars who visit or reside within a VU region associated with alternative music may have a higher acceptance level for the use of strong language, images or offensive word usage than a general VU population, and accordingly rules may be defined specific to an alternative music region that allow higher levels of offensive word usage. VU region providers and other service providers may thus provide better and better-received services to specific avatars, adding interests and behavioral attributes in common with a collective or corporate body of the VU or region thereof, in one aspect leveraging common interpersonal communication tendencies and characteristics to define and provide automated customization of VU avatar engagement rules and norms. Advantages are thus provided in a number of virtual universe engagement contexts, including commercial sales and marketing opportunities, assuring appropriate normative streamed content on demand, providing services responsive to client requirements, requests and needs, and enhancing the experience of a virtual universe resident thereby encouraging use of the virtual universe domain or one or more regions thereof by an avatar.

The present invention may be contrasted with prior methodology for controlling avatar behavior within a VU that use absolute or strict rules, for example "you cannot speak more than X number of offensive words in a time period," or "you cannot run faster than X mph within this restricted area." The inflexibility of such simplistic and strict prior art rule defining and administration may not be perceived well by VU residents, and the static creation and enforcement of such strict and absolute rules in prior art virtual universe supervision methods and systems results directly in some VU residents terminating their engagement with such a prior Art VU. It is generally not possible to effectively enforce an absolute rule if most avatars are violating the rule: for example, if every avatar is running faster than X mph within a restricted area, then enforcing this rule against one avatar may be perceived as unfair selective enforcement action, or as an arbitrary and unjustified exercise of authoritative power by the enforcing entity.

Embodiments of the present invention may instead identify only those avatars which are running relatively faster than other avatars, or even configured to select and identify only the fastest rule-breaker, thereby defining the rule dynamically in response to the actual real-time collective will of the VU, rather than through some static and rigid determination of an appropriate speeding rule that bears no relevance to the actual actions of the avatars inhabiting the VU. Algorithms according to the present invention may be used to dynamically define rules and thresholds, revising them upward or downward as appropriate as a function of observed collective will, as well as to spot and reprimand only avatars that have behavior different from that of the collective whole. Moreover, by basing enforcement on a current analysis of the general population (such as all those presently participating in a VU or region thereof), a definition of what is acceptable under a given rule may be dynamically revised as a function of current avatar behavior observations, thus dynamically relaxing or tightening the enforcement of, or adjustment of a threshold of, a rule or constraint as the demographics or other attributes of the general population changes. For example, the conduct condoned by fellow collective avatars attending a rock music event may be different than that condoned by avatars attending a baroque classical music event, with normative rule and thresholds set as a function of identifying the avatars and their historic and current behaviors and expectations accordingly.

Embodiments of the present invention enable automated VU rules and normative behavior enforcement mechanisms to achieve flexibility's more often associated with real-life human enforcement entities, such as police officers. For example, in the real world enforcement of speeding laws by police officers involves more than rigidly and inflexibly applying speed limits: enforcement of a specified highway speed limit of 65 miles-per-hours (mph) usually involves consideration of traffic conditions including for example road surface and weather conditions, time of day, amounts of the vehicle or pedestrian traffic, resulting in shifting and variable triggers for enforcing the speed limit. Thus a motorist may be allowed to travel at 79 mph in a first set of traffic conditions, yet be issued a speeding citation in a second set of traffic conditions indicating 72 mph as a more appropriate enforced upper limit for the same road.

According to the present invention, dynamically shifting collective behaviors of subset groups within a virtual universe environment may be dynamically considered and utilized in defining and enforcing norms and rules. For example, in a rambunctious or emotionally charged setting, such as a protest or a large collection of agitated avatars many, if not most or all, of a group of avatars may be violating a rule. However enforcement of the rule against all of the rule-breakers may not be possible or appropriate, and enforcing a rule rigidly against too many of a plurality of avatars within a protest situation may exacerbate rather than abate the situation. Thus, according to the present invention enforcing entity may dynamically define and/or enforce a behavior rule by selectively reprimanding avatars as function of the aggregate behavior of an appropriate subset of avatars, for example focusing only upon those avatars leading the protest or are generally violating more rules than the collective considered as a whole (or a sample thereof), and moreover wherein other avatars in other regions of the VU not involved in this particular subset may experience a stricter or more lenient application of a same rule and threshold.

Rule enforcement and interpretation may also be contextual. For example, it may be against a rule for an avatar to use certain loud sound-generating animated scripts (for example, one that produces air horn sounds over a designated sound level) in a public forum space shared by other avatars. However, if an avatar using such an air horn script is one of avatars in the public forum wherein a majority of the avatars are loudly celebrating a joyous event (such as, for example a championship of a sports team supported by a majority of the avatars), then a collective behavior norm or context may indicate that it is appropriate to ignore a reasonable level of violation of this otherwise-absolute rule during a duration of the context.

In some embodiments, data indicative of collective will or norms includes point data. Defining or revising rules, as well as monitoring avatar rule observance and comparing monitored observance to thresholds, may comprise collecting and interpreting data points relative to one or more sets of criteria within a VU, such as measuring and comparing individual avatar point data. In one example for an offensive word rule setting a VU, an enforcement or monitoring entity may collect data points (for example, random or pointed) as a function of individual observed discrete offensive word usages by a collective to determine enforcement of the offensive word rule. Thus, if a rule limit is "no more than three uses of restricted offensive words per hour," the violation of which incurring a VU management action (e.g. suspending an avatar's account), an enforcing entity may look to occurrence point data to correlate this rule with an actual average usage for a collective of avatars within the VU or region there of, and adjust the rule or threshold up or down in proportion to or direct relation to a difference or variance of the rule or threshold from the determined actual average.

Embodiments of the present invention may be configured to constantly compare the behaviors of avatars within the virtual world, and/or also constantly comparing those actions to a current set of rules. Based on a percentage of avatars observed violating one or more of the rules, one or more of the rules may then be relaxed or tightened for a period of time, or modified to be less or more strict until a next revision, sometimes through an iterative process. In some embodiments, point data may be extrapolated, for example from a smaller sample collective group to determine an average usage for an entire population. A trend of tightening or loosening the rule projected from a current rate of change evidenced by the collective behavior may also be used, resulting in a modification of a rule/threshold responsive to predicted future changes in observed norms.

A collective may be a subset of avatars selected for behavior monitoring. The subset may be a predetermined sample set of avatars chosen as representative of one or more aspects of a VU domain or regional collective body of avatars, for example chosen based on a specific demographic criterion of an avatar such as location, age and other demographic data. In some embodiments the subset sample may be randomly chosen, for example a random X percent of the total.

Monitoring and data collecting avatars may also be chosen as a function of rules to be managed or enforced. For example, monitoring for offensive words spoken/time period data may include issuing time-stamped alerts every time an avatar uses a proscribed offensive word, wherein the alert data may be processed as a function of time to determine offensive word frequencies.

Data collection may encompass data generated from multiple types of avatar actions, for example through monitoring and/or parsing avatar conversations, speech, as well as movement (e.g. offensive gestures), inventory (e.g. possession of offensive items), and other appropriate data will be apparent to one skilled in the art. Data collection may be constant, such as in real time or on an ongoing basis, or it may be intermittent, for example acquired or sampled on-demand or at specific scheduled intervals. Collected data may be extrapolated to other avatars, including larger groups or even an entire population of a virtual world as a whole, in one respect enabling the setting of a collective behavior norm baseline for the collective VU community as a whole.

Rule and threshold revisions according to the present invention may be automated, or manually entered or confirmed. For example, a determination as provided above that an offensive word rule of "no more than three offensive words per minute" should be revised to "no more than five offensive words per minute" may be provided as a recommendation to a VU administrator or provider, a service provider or an enforcement entity, through an e-mail, chat, alert dialog or other communication or notification means, wherein the actual revision must be manually entered or authorized by the notified entity.

In another aspect, rule and threshold revisions may be revised, or rule-breaking avatars defined or recognized, as a function of observed divergences between the behaviors of one or more representative avatars to that of a larger collective group of avatars, thus as a function of an individual/subset-to-group comparison analysis. For example, with reference to FIG. 1, in some embodiments defining a rule or threshold at 102 is a function of observation data acquired at 104 from a representative subset of a collective group of avatars, with observations or determinations from the representative subset extrapolated to represent the collective will. Furthermore, monitoring avatars at 108 may comprise monitoring only representative individual avatars or subset groups of the collective group of avatars. Monitored representative individuals/subsets may be the same as or included within the representative individual or subset group of avatars used for collective will determination or extrapolation at 104 and 102, or they may comprise different individuals or groups/subsets of avatars.

Representative avatars may be chosen at random. In some embodiments, random selection of individuals/subsets are continually or regularly repeated, in one aspect to enable that each avatar of the collective group has a possibility of being monitored for violations relative to the collection as a whole. Representatives may also be specifically chosen and selected through demographic and other data indicating that they may be relevant or otherwise comprise a better representative sample of one or more relevant aspects of the collective. For example, representatives may be chosen based on a number of violations of the same or similar rules in the past, or pursuant to historic data indicating a proclivity to relevant behavior (e.g. an avatar with a history of using offensive words may be chosen to monitor in order to determine efficacy of enforcement of a collective, normative rule or threshold).

Collective or sample avatars may be chosen as a function of group status, for example choosing avatars particularly influential or important within a given collective for a smaller sample group. Influential avatars may be selected not necessarily as representative of an average collective behavior norm group as much as representative of aspirational or ideal group norms, ones the collective may value highly as a function of valuing the influential/important avatar highly. In some examples, influential/important avatar behaviors and common norms may be identified and weighted more heavily in consideration with other collective group avatar data to determine a collective rule or threshold. For example, monitoring may comprise monitoring behavior of a specific influential avatar of a collective of avatars, wherein determining an amount of compliance with a rule, collective behavior norm, etc., comprises determining a specific amount of compliance of the monitored influential avatar with the rule, weighting the determined influential avatar's amount of compliance more heavily than an amount of compliance of others of the collective of avatars to generate weighted compliance data, and determining an amount of compliance from the weighted compliance data.

Data from monitoring representative individual/subset groups at 108 may thus be extrapolated to a representation of behavior of the collective whole, and thus any observed divergence from rules and thresholds believed representative of the collective will may be used to revise those same rules and thresholds to bring them back in line with the extrapolated representation of the collective will, for example through the processes and methods illustrated in FIG. 1 and described above. The representative individual/subset groups may also function to serve an enforcement mechanism for the entire collective whole: for example, in some embodiments it may not be efficient or desired to monitor every member of the collective whole, and thus representative individuals/subsets may be chosen for monitoring and enforcement, in one aspect wherein enforcement of the rules against the chosen representatives may function as notification of rule enforcement to remaining other non-monitored members of the collective will, thereby urging them to voluntarily comply with the rules. In one aspect, collective group avatar's may not be individually aware of whether their actions are being monitored or not, and the possibility of random selection and monitoring (and associated imposition of management actions by a VU provider for violating rules) may function to cause non-monitored avatars to self-police their own behavior to stay within the rules.

Thus, the present invention enables the dynamic revision of rules and thresholds and applications thereof in response to current actual observed behavior of avatars, thereby avoiding a drift of rules and regulations and applications away from norms and expectations of the collective group, and avoiding VU resident dissatisfaction through imposing unnecessary or unmanageable rules. For example, a commercial region within a VU may have a rule stating that no avatar should be able to wear casual clothes, which may inconvenience or annoy some VU residents and keep them from entering the site, resulting in a loss of business opportunities. If, however, processes, methods and systems according to the present invention determine that the collective avatars using the region do not mind engaging other avatars wearing casual clothes therein, then the rule may be automatically revised or administrators of the region may be alerted and advised to relax or change the rule, thereby expanding availability to the region to casually attired avatars.

Figure 3:
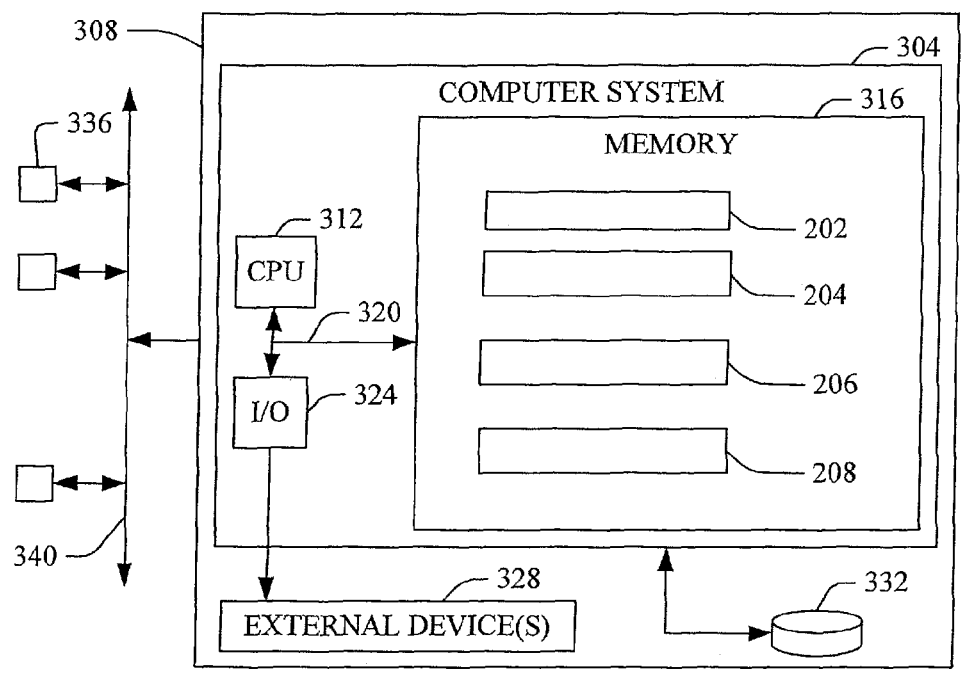
FIG. 3 is a block diagram illustrating an exemplary computerized implementation of a system and method for applying, setting and/or revising an avatar behavior rule or application thereof within a virtual universe environment according to the present invention.

The present invention may be implemented using conventional software tools and methods applicable to virtual universes, for example within a stand-alone VU application, or as a plug-in to an existing VU application. The system and mechanisms described could be implemented in a hosting system or grid for a virtual universe or in client software for the virtual universe installed on a user's personal computer or other programmable device. Referring now to FIG. 3, an exemplary computerized implementation includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the present invention, including the methods, processes and devices/systems illustrated in the Figures and described herein, including the rule/threshold definer component 202, avatar monitor component 204, the compliance determiner component 206 and the action engine component 208, which are stored in memory 316 and/or storage system 332. It is to be appreciated that two or more, including all, of the components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware. To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 3 can be included in computer system 304. Moreover, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to practice an embodiment according to the present invention, including the methods, processes and devices/systems illustrated in the Figures and described herein. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.)

Still yet, computer infrastructure 308 is intended to demonstrate that some or all of the components of implementation could be deployed, managed, serviced, etc. by a service provider who offers to implement, deploy, and/or perform the functions of the present invention, including methods, processes and devices/systems according to the present invention as illustrated in the Figures and described herein, for example by licensing methods and browser or application server technology according to the present invention to an internet service providers (ISP) or cellular telephone provider. In one embodiment the invention may comprise a business method that performs the process steps of the invention on a subscription, advertising, and/or fee basis. Thus a service provider can create, maintain, support, etc., a computer infrastructure, such as the computer infrastructure 308 that performs the process steps of the invention, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a specific "first" element distinguished from another specific "second" of a plurality of elements, a "primary" distinguished from a "secondary," an "another", etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for applying an avatar behavior rule within a virtual universe environment, comprising:
monitoring a behavior of a collective plurality of avatars within a virtual universe environment for compliance with a violation threshold of an avatar behavior rule for the virtual universe environment, and to determine if any of the avatars is complaining that the monitored behavior of another of the avatars is at an objectionable level within the virtual universe environment;
determining an amount of compliance of the monitored collective plurality behavior with the rule;
comparing the determined compliance amount with the violation threshold;
if the determined compliance amount does not exceed the violation threshold and any of the avatars is determined to be complaining that the monitored behavior of another of the avatars is at an objectionable level within the virtual universe environment, revising the violation threshold downward, wherein a lower level of the determined compliance amount is required to exceed the violation threshold; and
repeating the steps of monitoring the behavior of the collective plurality of avatars within the virtual universe for compliance with the rule and to determine if any of the avatars is complaining that the monitored behavior of another of the avatars is at the objectionable level within the virtual universe environment, determining the amount of compliance of the monitored collective plurality behavior with the rule, comparing the determined compliance amount with the revised violation threshold, and revising the violation threshold downward, until the monitored compliance amount exceeds the revised violation threshold or none of the avatars is determined to be complaining that the monitored behavior of another of the avatars is at the objectionable level within the virtual universe environment.

2. The method of claim 1, further comprising:
determining an average level of compliance of the collective plurality of avatars from determined amounts of compliance of each of the collective plurality of avatars;
defining the violation threshold of the avatar behavior rule as the determined average level of compliance.

3. The method of claim 2, further comprising:
dynamically determining the average level of compliance from a current behavior observation value; and
dynamically revising the violation threshold downward in proportion to a difference from the current behavior observation value from a previous behavior observation value.

4. The method of claim 3, further comprising:
the monitoring comprising monitoring a behavior of a first avatar of the collective plurality of avatars;
the determining an amount of compliance comprising determining a first amount of compliance of the monitored first avatar with the rule;
the comparing the compliance amount comprising comparing the first compliance amount with the violation threshold; and
taking a rule enforcement action against the first avatar if the first amount of compliance exceeds the threshold.

5. The method of claim 4, further comprising selecting each of the collective plurality of avatars as a function of a historic behavior data of each relevant to the rule.

6. The method of claim 5, the each historic behavior data indicating behavior of each one of the selected collective plurality of avatars diverging from the rule greater than an average value of divergence from the rule of a sample group of avatars within the virtual universe.

7. The method of claim 6, wherein at least one of the collective plurality and the sample group is an entirety of avatars residing within the virtual universe.

8. The method of claim 6, further comprising selecting each avatar of at least one of the collective plurality and the sample group as a function of participation in an activity in common with others of the at least one of the collective plurality and the sample group.

9. The method of claim 6, further comprising randomly selecting each avatar of at least one of the collective plurality and the sample group.

10. The method of claim 6, further comprising selecting each avatar of at least one of the collective plurality and the sample group in response to demographic data associated with a selected avatar correlating to a specified demographic criteria.

11. The method of claim 6, further comprising:
the monitoring comprising monitoring a behavior of a second avatar of the collective plurality of avatars;
the determining the amount of compliance comprising determining a second amount of compliance of the monitored second avatar with the rule;
the determining the average level of compliance of the collective plurality of avatars from behavior observation data comprising weighting the second amount of compliance determined for the second avatar more heavily than the first amount of compliance of the first avatar as a function of identifying the second avatar as more influential than the first avatar.

12. The method of claim 1, further comprising:
integrating computer-readable program code into a computer system comprising a processing unit, a computer readable memory and a computer readable tangible storage medium;
wherein the computer readable program code is embodied on the computer readable tangible storage medium and comprises instructions that, when executed by the processing unit via the computer readable memory, cause the processing unit to perform the steps of:
monitoring the behavior of the collective plurality of avatars within the virtual universe environment for compliance with the violation threshold of the avatar behavior rule, and to determine if any of the avatars is complaining that the monitored behavior of another of the avatars is at the objectionable level;
determining the amount of compliance of the monitored collective plurality behavior with the rule;
comparing the determined compliance amount with the violation threshold;
in response to the determined compliance amount not exceeding the violation threshold and any of the avatars determined to be complaining that the monitored behavior of another of the avatars is at an objectionable level, revising the violation threshold downward; and
repeating the steps of monitoring the behavior of the collective plurality of avatars, determining the amount of compliance of the monitored collective plurality behavior with the rule, comparing the determined compliance amount with the revised violation threshold, and revising the violation threshold downward, until the monitored compliance amount exceeds the revised violation threshold or none of the avatars is complaining that the monitored behavior of another of the avatars is at the objectionable level within the virtual universe environment.

13. An article of manufacture, comprising:
a computer readable medium having computer readable program code embodied therewith, the computer readable program code comprising instructions that, when deployed and executed on a computer system processing unit, cause the computer system processing unit to:
monitor a behavior of a collective plurality of avatars within a virtual universe environment for compliance with a violation threshold of an avatar behavior rule for the virtual universe environment, and to determine if any of the avatars is complaining that the monitored behavior of another of the avatars is at an objectionable level within the virtual universe environment;

determine an amount of compliance of the monitored collective plurality behavior with the rule;

compare the determined compliance amount with the violation threshold;

if the determined compliance amount does not exceed the violation threshold and any of the avatars is determined to be complaining that the monitored behavior of another of the avatars is at an objectionable level within the virtual universe environment, revise the violation threshold downward, wherein a lower level of the determined compliance amount is required to exceed the violation threshold; and repetitively monitor the behavior of the collective plurality of avatars within the virtual universe for compliance with the rule and to determine if any of the avatars is complaining that the monitored behavior of another of the avatars is at the objectionable level within the virtual universe environment, determine an amount of compliance of the monitored collective plurality behavior with the rule, compare the determined compliance amount with the revised violation threshold, and revise the violation threshold downward, until the monitored compliance amount exceeds the revised violation threshold or none of the avatars is determined to be complaining that the monitored behavior of another of the avatars is at the objectionable level within the virtual universe environment.

14. The article of manufacture of claim 13, wherein the program code further causes the computer system processing unit to:
determine an average level of compliance of the collective plurality of avatars from determined amounts of compliance of each of the collective plurality of avatars; and
define the violation threshold of the avatar behavior rule as the determined average level of compliance.

15. The article of manufacture of claim 13, wherein the program code further causes the computer system processing unit to:
determine the average level of compliance dynamically from a current behavior observation value; and
dynamically revise the violation threshold downward in proportion to a difference from the current behavior observation value from a previous behavior observation value.

16. The article of manufacture of claim 13, wherein the program code further causes the computer system processing unit to:
select each of the collective plurality of avatars as a function of at least one of:
participation in an activity in common with others of the collective plurality; and
demographic data associated with a selected avatar correlating to a specified demographic criterion.

17. A programmable device comprising:
a processing unit;
a computer readable memory in communication with the processing unit;
a tangible computer-readable storage medium in communication with the processing unit; and
a network interface in communication with the processing unit and a virtual universe environment;
wherein the processing unit, when executing program instructions stored on the tangible computer-readable storage medium via the computer readable memory, is caused to:
monitor a behavior of a collective plurality of avatars within a virtual universe environment for compliance with a violation threshold of an avatar behavior rule for the virtual universe environment, and to determine if any of the avatars is complaining that the monitored behavior of another of the avatars is at an objectionable level within the virtual universe environment;

determine an amount of compliance of the monitored collective plurality behavior with the rule;

compare the determined compliance amount with the violation threshold;

if the determined compliance amount does not exceed the violation threshold and any of the avatars is determined to be complaining that the monitored behavior of another of the avatars is at an objectionable level within the virtual universe environment, revise the violation threshold downward, wherein a lower level of the determined compliance amount is required to exceed the violation threshold; and repetitively monitor the behavior of the collective plurality of avatars within the virtual universe environment for compliance with the rule and to determine if any of the avatars is complaining that the monitored behavior of another of the avatars is at the objectionable level within the virtual universe environment, determine an amount of compliance of the monitored collective plurality behavior with the rule, compare the determined compliance amount with the revised violation threshold, and revise the violation threshold downward, until the monitored compliance amount exceeds the revised violation threshold or none of the avatars is determined to be complaining that the monitored behavior of another of the avatars is at the objectionable level within the virtual universe environment.

18. The programmable device of claim 17, wherein the processing unit, when executing the program instructions stored on the tangible computer-readable storage medium via the computer readable memory, is further caused to:
determine an average level of compliance of the collective plurality of avatars from determined amounts of compliance of each of the collective plurality of avatars; and
define the violation threshold of the avatar behavior rule as the determined average level of compliance.

19. The programmable device of claim 17, wherein the processing unit, when executing the program instructions stored on the tangible computer-readable storage medium via the computer readable memory, is further caused to:
determine the average level of compliance dynamically from a current behavior observation value; and
dynamically revise the violation threshold downward in proportion to a difference from the current behavior observation value from a previous behavior observation value.

20. The programmable device of claim 17, wherein the processing unit, when executing the program instructions stored on the tangible computer-readable storage medium via the computer readable memory, is further caused to:
select each of the collective plurality of avatars as a function of at least one of:
participation in an activity in common with others of the collective plurality; and
demographic data associated with a selected avatar correlating to a specified demographic criterion.

* * * * *